R. LOOG.
EXPANSIBLE BRACELET.
APPLICATION FILED APR. 12, 1912.

1,034,471.

Patented Aug. 6, 1912.

WITNESSES

Richard Loog, INVENTOR

BY Philip K. Stein
his ATTORNEY

UNITED STATES PATENT OFFICE.

RICHARD LOOG, OF PFORZHEIM, GERMANY.

EXPANSIBLE BRACELET.

1,034,471.  Specification of Letters Patent.  Patented Aug. 6, 1912.

Application filed April 12, 1912. Serial No. 690,375.

*To all whom it may concern:*

Be it known that I, RICHARD LOOG, a subject of the Emperor of Germany, residing at Pforzheim, in the Grand Duchy of Baden, Germany, have invented certain new and useful Improvements in Expansible Bracelets, of which the following is a specification.

My invention in expansible bracelets relates to a bracelet structure consisting of a plurality of links and housed springs connected up in a manner whereby the structure is adapted to expand and contract within the desired limits to provide the necessary expansion, to enable the bracelet to be passed over the hand of the wearer and on the other hand to sufficiently contract about the wrist to afford the requisite security against accidental displacement.
My invention has particular reference in its features, to constructional detail, more particularly directed to the insurance of rigidity and strength as well as the affording of facilities in manufacture which features conduce to the object of my invention.

In the accompanying drawing, which forms a part of this specification when taken with the correlative appended descriptive matter, is illustrated the manner in which I reduce my improved expansible bracelet structure to practice, and the distinct features of novelty are referred to in the claims at the conclusion of the specification.

Figure 1:
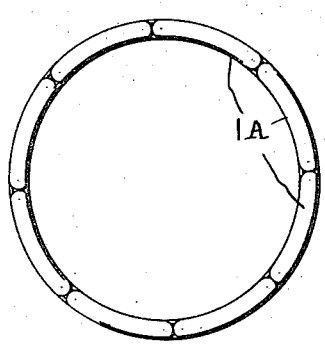
Figure 2:
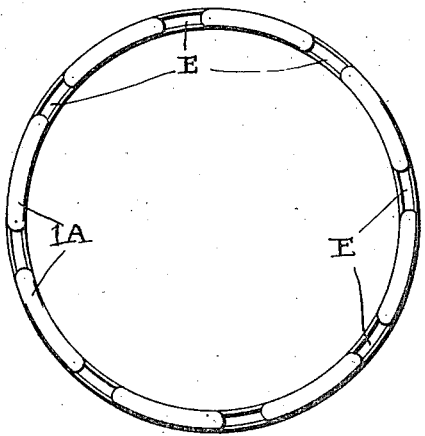
Figure 3:
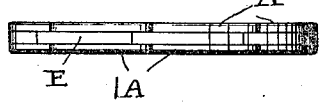
Figures 4, 5, 6:
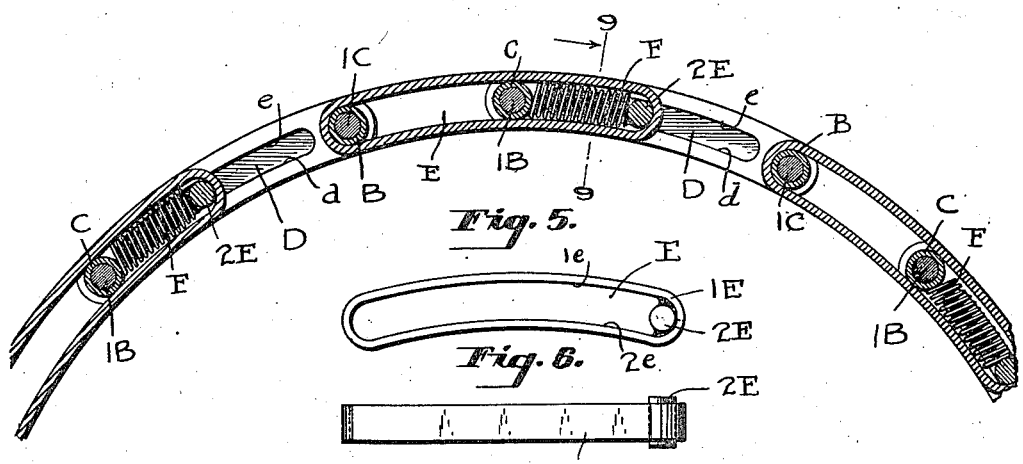
Figure 7:
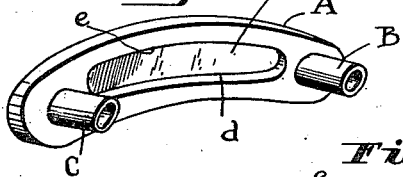
Figure 8:
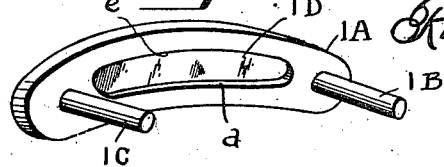
Figure 9:
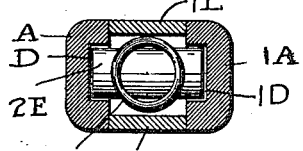

With reference to the drawings: Figure 1 is a side elevational view of the bracelet in a contracted condition. Fig. 2 is a like view to that of Fig. 1 illustrating the same in an expanded condition. Fig. 3 is a top plan view of the same illustrating the condition of the bracelet referred to in Fig. 1. Fig. 4 is an enlarged fragmentary sectional elevational view taken through the link structure. Fig. 5 is an enlarged side elevational view of a type of link and guide pin involving one system of links in the structure. This type I shall designate a secondary link and guide pin. Fig. 6 is a top plan view thereof. Fig. 7 is an enlarged perspective view of a link plate and guide way provided with a pair of terminal tubular rivets. Fig. 8 is a similar view of another similar and supplementary link plate having terminal solid rivets adapted to telescope and mutually engage the tubular rivets of the link plate illustrated in Fig. 7 while the guide way of each are correspondingly opposite each other. I shall refer to these two link plates when assembled, as a primary link structure. Fig. 9 is a transverse sectional elevational view taken on the line 9—9 of Fig. 4 as indicated by the dart.

In the several views similar characters of reference are employed to designate like or the same parts throughout where they occur, wherein—

A designates a primary link plate of curved formation, the curvature of which is an arc of a circle taken from a radius either within the smaller circle Fig. 1 or large circle Fig. 2 or a mean between the proportion of the two as may be determined by the normal contracted condition of the bracelet on the wrist of the wearer to present the most artistic effect.

B and C refer to terminal tubular rivets which project from the link plate A perpendicular thereto and parallel with each other and at each of the terminals thereof. I prefer to construct these tubular rivets of gold or other suitable material of which the bracelet is composed and shoulder them in and head them over in the manner of rivets, whereby they will project rigidly and securely from the inner surface of the link plate A or that surface opposite to that of the link plate referred to in Fig. 8 when these two plates are assembled.

D refers to a pocketed guide way pressed or otherwise formed in the inner surface of the link plate A and has lateral walls $d$ and $e$ at right angles to the surface of the link plate A and parallel with each other and parallel with the curved formation of said link plate.

$1^A$ designates a link plate of identical form to that of the plate A and is provided with a similar guide way $1^D$ and terminal shouldered rivets $1^B$ and $1^C$, these are secured to the inner surface of the link plate $1^A$, in a similar manner to the tubular rivets B and C of the link plate A and are correspondingly disposed to telescope and engage therewith.

E designates an open link of curved formation, having its opposite lateral inner walls $1^e$ and $2^e$ parallel to each other formed of a contiguous strip $1^E$ of suitable metal having its free ends united by soldering, welding or by any other well known manner or when occasion demands, I may form the link E from a narrow band of seamless tubing.

Within the open link E and at one terminal thereof is a transverse guide pin $2^E$ which is secured in position by soldering it in the inner walls $1^e$ and $2^e$ and to the inner surface of the end of the strip $1^E$. The link E I shall refer to as a secondary link member of the structure.

F designates compression springs; each of which is adapted to be engaged between the guide pins $2^e$ and an adjacent tubular rivet B of a pair of respectively primary and secondary links when these members are articulated in the formation of the bracelet; they are housed within the pockets D and $1^D$ of the primary links respectively and the walls $1^e$ and $2^e$ of the secondary link. This disposition of the springs F is fully elucidated in Fig. 9.

In the assembling of my improved bracelet structure, the open link E is linked with the tubular rivet B of the link plate A, and a tubular rivet C of a second link plate A is similarly assembled in the open link E; whereby the tubular rivets B and C of the respective link plates, when assembled, will lie within the link E adjacent to each other.

It must be observed in the assembling of the link plate A with the open link E that the guide pin $2^E$ enters and is guided in the guide way or pocket D and that the edge of the strip $1^E$ of the open link E lies in contact with the inner surface of the link plate A whereby the guide pin $2^E$ and the link plate A and open link E will be in sliding engagement with each other; after thus assembling a pair of these primary and secondary links the thrust spring F is interposed between the tubular rivet C and the guide pin $2^E$ when it will be found, due to the compression of this spring; contraction between the primary and secondary link members will ensue.

The entire link structure requisite for the formation of the bracelet is preferably articulated in this manner, after which the link plates $1^A$, having the solid shouldered rivets $1^B$ and $1^C$, may be assembled with their corresponding link plates A as a cover therefor, which are secured in their covering position by heading the projecting or free ends of the shouldered rivets $1^B$ and $1^C$.

It will be observed by the foregoing description of my improved bracelet that by the introduction of a system of double rivets between the link plates A and $1^A$, mutually engaging with each other, that considerable rigidity of the primary link structure is effected and moreover, rigidity is afforded to the secondary link structure by the transverse solid guide pin $2^E$ plying in the pocketed guide ways D and $1^D$ of the rigid primary link structure and Having fully described my invention I claim as new and desire to secure Letters Patent of the United States—

1. In an expansible bracelet, a primary link structure and a secondary link structure coupled together, the primary link structure being provided with a system of interposed mutually engaging telescopic rivets and lateral guide ways and a secondary link structure embracing a pair of said rivets and a terminal guide pin carried by the secondary link structure engaging the guide ways in another primary link structure.

2. In an expansible bracelet, a primary link structure and a secondary link structure coupled together, the primary link structure being provided with a system of interposed spacing mutually engaging telescopic shouldered rivets and lateral guide ways, and the secondary link structure embracing a pair of the said rivets of each of the consecutive links of the primary link structure, and a terminal guide pin carried by the secondary link structure engaging the guide ways in one of the links of the primary link structure, and a compression spring interposed between the said guide pin and telescopic rivets.

In testimony whereof, I have signed my name to this specification in the presence of two subscribing witnesses.

RICHARD LOOG.

Witnesses:
F. X. GRIGER,
K. REIMMER.